United States Patent
Wang

(10) Patent No.: US 10,551,952 B2
(45) Date of Patent: Feb. 4, 2020

(54) ARRAY SUBSTRATE, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiao Wang, Beijing (CN)

(73) Assignees: BOE TECHNOLOGY GROUP CO., LTD., Beijing (CN); BEIJING BOE DISPLAY TECHNOLOGY GROUP CO., LTD., Beijing (CN)

( * ) Notice: Subject to any disclaimer, the term of this patent is extended or adjusted under 35 U.S.C. 154(b) by 104 days.

(21) Appl. No.: 15/744,228

(22) PCT Filed: Aug. 10, 2017

(86) PCT No.: PCT/CN2017/096747
§ 371 (c)(1),
(2) Date: Jan. 12, 2018

(87) PCT Pub. No.: WO2018/033008
PCT Pub. Date: Feb. 22, 2018

(65) Prior Publication Data
US 2019/0004646 A1    Jan. 3, 2019

(30) Foreign Application Priority Data
Aug. 19, 2016   (CN) .......................... 2016 1 0698432

(51) Int. Cl.
*G06F 3/041*     (2006.01)
*G02F 1/1333*    (2006.01)
(Continued)

(52) U.S. Cl.
CPC ........ *G06F 3/0412* (2013.01); *G02F 1/13338* (2013.01); *G02F 1/134336* (2013.01);
(Continued)

(58) Field of Classification Search
CPC ......... G06F 3/0412; G06F 2203/04112; G06F 3/0416; G02F 2201/121; G09G 2300/0426
See application file for complete search history.

(56) References Cited

U.S. PATENT DOCUMENTS 9,939,972 B2 *   4/2018   Shepelev ................ G06F 3/044
2010/0182273 A1   7/2010   Noguchi et al.
(Continued)

FOREIGN PATENT DOCUMENTS

CN    101681221 A    3/2010
CN    102650916 A    8/2012
(Continued)

OTHER PUBLICATIONS

First Office Action for Chinese Patent Application No. 201610698432.3 dated Jun. 5, 2018.
(Continued)

*Primary Examiner* — Sanjiv D. Patel
(74) *Attorney, Agent, or Firm* — Calfee, Halter & Griswold LLP

(57) ABSTRACT

An array substrate, a display panel and a display device are disclosed. The array substrate includes a base substrate and common electrode on the base substrate. The common electrode includes a plurality of sub-electrodes in an array, each being used for receiving a common voltage signal and a touch scan signal in a time-sharing manner. The array substrate further includes a common electrode wire corresponding to each sub-electrode. Each sub-electrode receives the common voltage signal through the common electrode wire, and the common electrode wire corresponding to each sub-electrode includes multiple sub-electrode wires, each being connected to the corresponding sub-electrode.

17 Claims, 3 Drawing Sheets

(51) Int. Cl.
*G02F 1/1343* (2006.01)
*G02F 1/1362* (2006.01)
*G06F 3/044* (2006.01)
*G09G 3/36* (2006.01)

(52) U.S. Cl.
CPC ........ *G02F 1/136286* (2013.01); *G06F 3/044* (2013.01); *G06F 3/0416* (2013.01); *G02F 2001/136295* (2013.01); *G02F 2201/121* (2013.01); *G09G 3/3648* (2013.01); *G09G 2320/0233* (2013.01)

(56) References Cited

U.S. PATENT DOCUMENTS

| | | | |
|---|---|---|---|
| 2010/0194707 A1* | 8/2010 | Hotelling | G06F 3/0412 345/173 |
| 2012/0026136 A1* | 2/2012 | Zhang | G09G 3/3614 345/204 |
| 2012/0218199 A1 | 8/2012 | Kim et al. | |
| 2013/0033439 A1* | 2/2013 | Kim | G02F 1/13338 345/173 |
| 2013/0256707 A1* | 10/2013 | Chiang | H01L 33/08 257/88 |
| 2013/0293791 A1 | 11/2013 | Abe et al. | |
| 2013/0342479 A1* | 12/2013 | Pyo | G09G 3/00 345/173 |
| 2014/0160067 A1* | 6/2014 | Kim | G06F 3/0416 345/174 |

FOREIGN PATENT DOCUMENTS

| | | | |
|---|---|---|---|
| CN | 102914893 A | 2/2013 | |
| CN | 103383501 A | 11/2013 | |
| CN | 205486023 U * | 8/2016 | G06F 3/041 |
| CN | 205486023 U | 8/2016 | |
| CN | 106444173 A | 2/2017 | |
| KR | 20160027479 A | 3/2016 | |

OTHER PUBLICATIONS

Search Report for International Application No. PCT/CN2017/096747 dated Oct. 27, 2017.

* cited by examiner

US 10,551,952 B2

ARRAY SUBSTRATE, DISPLAY PANEL AND DISPLAY DEVICE

CROSS REFERENCE TO RELATED APPLICATION

This application is the U.S. national phase entry of PCT/CN2017/096747, with an international filling date of Aug. 10, 2017, which claims priority to the patent application No. 201610698432.3 filed with the Patent Office of the People's Republic of China on Aug. 19, 2016, the disclosure of which is entirely incorporated herein by reference.

TECHNICAL FIELD

The present disclosure relates to the field of display, in particular to an array substrate, a display panel and a display device.

BACKGROUND

One of the technologies for realizing touch display is to fabricate the common electrode on an array substrate as a plurality of sub-electrodes arranged in an array and drive the sub-electrodes in a time-sharing manner. That is, in a display phase, common voltage signals are loaded to the sub-electrodes, which, in cooperation with pixel voltage signals on the pixel electrodes, drive liquid crystal molecules of the display to deflect, and in a touch phase, touch scan signals are loaded to the sub-electrodes, then the sub-electrodes are used as self-capacitive touch sensors.

However, for the array substrate using the above-mentioned technology, the sub-electrodes have a high resistance, so images displayed in the display phase are prone to becoming greenish. Meanwhile, there still exists space for improving the brightness uniformity of the display panel comprising such an array substrate.

SUMMARY

An objective of the present disclosure is to provide an array substrate, a display panel and a display device, so as to alleviate or overcome the above-mentioned problems in the existing display panel and display device.

In order to achieve the above objective, in an aspect, the present disclosure provides an array substrate comprising a base substrate, a common electrode on the base substrate, the common electrode including a plurality of sub-electrodes arranged in an array, each sub-electrode being used for receiving a common voltage signal and a touch scan signal in a time-sharing manner, and a common electrode wire corresponding to each sub-electrode. Each sub-electrode receives the common voltage signal through the common electrode wire, and the common electrode wire comprises multiple sub-electrode wires, each of the multiple sub-electrode wires being connected to the sub-electrode corresponding to the common electrode wire.

In certain exemplary embodiments, the common electrode wire corresponding to each sub-electrode comprises multiple first sub-electrode wires extending in a first direction and/or multiple second sub-electrode wires extending in a second direction.

In certain exemplary embodiments, in the common electrode wire corresponding to each sub-electrode, each of the first sub-electrode wires is connected to one or more second sub-electrode wires.

In certain exemplary embodiments, the array substrate further comprises a gate line and a data line on the base substrate, wherein the first sub-electrode wires and the gate line extend in a same direction and are formed in a same layer with a same material, the second sub-electrode wires and the data line extend in a same direction and formed in a same layer with a same material.

In certain exemplary embodiments, an orthographic projection of the first sub-electrode wire on the base substrate falls within an orthographic projection of the corresponding sub-electrode on the base substrate. Among the multiple second sub-electrode wires corresponding to each of the sub-electrodes, one second sub-electrode wire extends to be connected to a drive chip, while orthographic projections of the rest second sub-electrode wires on the base substrate fall within an orthographic projection of the corresponding sub-electrode on the base substrate. The drive chip is used for loading the common voltage signal and the touch scan signal to corresponding sub-electrodes in a time-sharing manner through the second sub-electrode wire connected thereto.

In certain exemplary embodiments, for the sub-electrode array arranged along the second direction in the common electrode, the number of the second sub-electrode wires corresponding to the sub-electrodes close to the drive chip is smaller than the number of the second sub-electrode wires corresponding to the sub-electrodes far from the drive chip.

In certain exemplary embodiments, one of the first sub-electrode wire and the second sub-electrode wire has a same extension direction as the gate line in the array substrate, and the other has a same extension direction as the data line in the array substrate.

In certain exemplary embodiments, the array substrate further comprises a plurality of sub-pixels arranged as an array, two data lines are provided between two adjacent columns of sub-pixels so that each column of sub-pixels is interposed between left data lines and right data lines. For the data lines at the left and right sides of each column of sub-pixels, one of them is used for driving sub-pixels of odd rows and the other is used for driving sub-pixels of even rows. One gate line is provided every two rows of sub-pixels, each gate line being used for driving two rows of sub-pixels adjacent thereto.

In certain exemplary embodiments, the first sub-electrode wire is arranged between two adjacent rows of sub-pixels having no gate line provided therebetween. The second sub-electrode wire is arranged between the two data lines that are between two adjacent columns of sub-pixels.

Another embodiment of the disclosure provides a display panel, comprising the array substrate according to any one of above embodiments.

A display device is further provided by the disclosure, which comprises the display panel according to the foregoing embodiment and a drive chip for providing the common voltage signal and the touch scan signal to the sub-electrodes in a time-sharing manner.

DETAILED DESCRIPTION OF EMBODIMENTS

In order to make the technical problem to be solved by the present disclosure and the technical solution and the advantages of the present disclosure clearer, detailed descriptions will be given below in conjunction with the drawings and specific examples.

Figure 1:
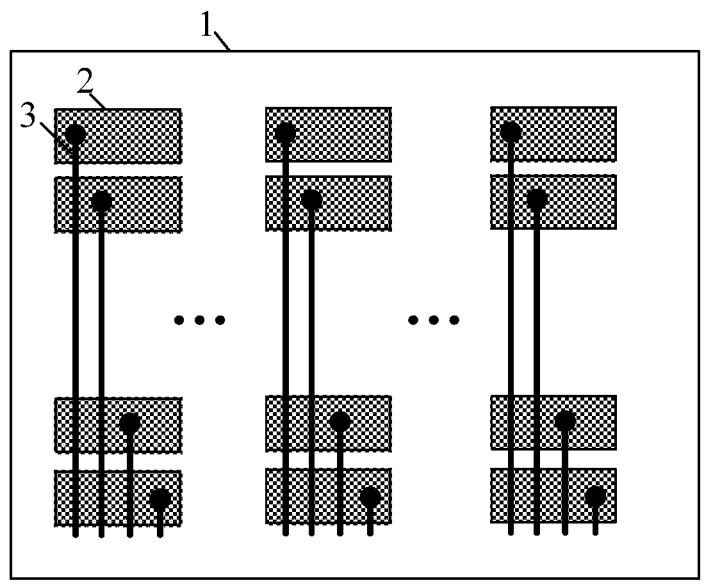
FIG. 1 is a schematic view showing a sub-pixel and a common electrode wire on an array substrate in the present disclosure.

An array substrate provided by an embodiment according to the present disclosure, as shown in FIG. 1, comprises a base substrate 1 and a common electrode on the base substrate 1. The common electrode includes a plurality of sub-electrodes 2 arranged in an array, each sub-electrode 2 being used for receiving a common voltage signal and a touch scan signal in a time-sharing manner. The array substrate further comprises a common electrode wire 3 corresponding to each sub-electrode 2 for receiving the common voltage signal.

Figure 2:
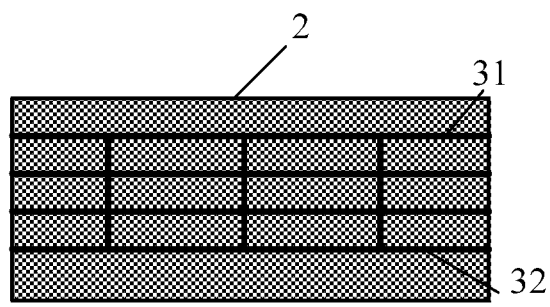
FIG. 2 is a schematic view showing a sub-electrode and sub-electrode wires in corresponding common electrode wire on an array substrate in the present disclosure.

Further referring to FIG. 2, the common electrode wire 3 corresponding to each sub-electrode 2 comprises multiple sub-electrode wires 31, 32, each of the multiple sub-electrode wires is connected to the corresponding sub-electrode 2 so as to reduce the resistance of the sub-electrode 2.

In certain exemplary embodiments, the sub-electrode 2 and the common electrode wire 3 are arranged in different layers, with at least an insulating layer interposed therebetween. As an example, for the common electrode wire 3 in this embodiment, there is at least one via hole corresponding to each of the sub-electrode wires in the insulating layer, and each of the sub-electrode wires 31, 32 can be connected to the sub-electrode 2 through the at least one via hole. Thus, it should be appreciated that the word "connect" and its conjugation mentioned herein includes not only direct connection, but also refers to indirect connection via an intermediate.

Compared to a conventional array substrate, for the array substrate provided in the present embodiment, the resistance of each sub-electrode in the common electrode is effectively reduced, thereby alleviating or eliminating greenish phenomenon of the images displayed. In addition, since the resistance of each sub-electrode is reduced, differences in resistances between sub-electrodes can be reduced, too, as a result, brightness of the images displayed becomes more uniform.

It should be noted that, FIG. 2 only intends to illustrate the sub-electrode wires included in one common electrode wire in the present embodiment by way of example, those skilled in the art can make variances to the arrangement of the sub-electrode wires on the basis of the solution disclosed in this example, and the different implementations of the sub-electrode wires fall within the scope of the invention.

An embodiment applying the array substrate proposed in the present disclosure will be described in further detail below with reference to an example.

Figure 3:
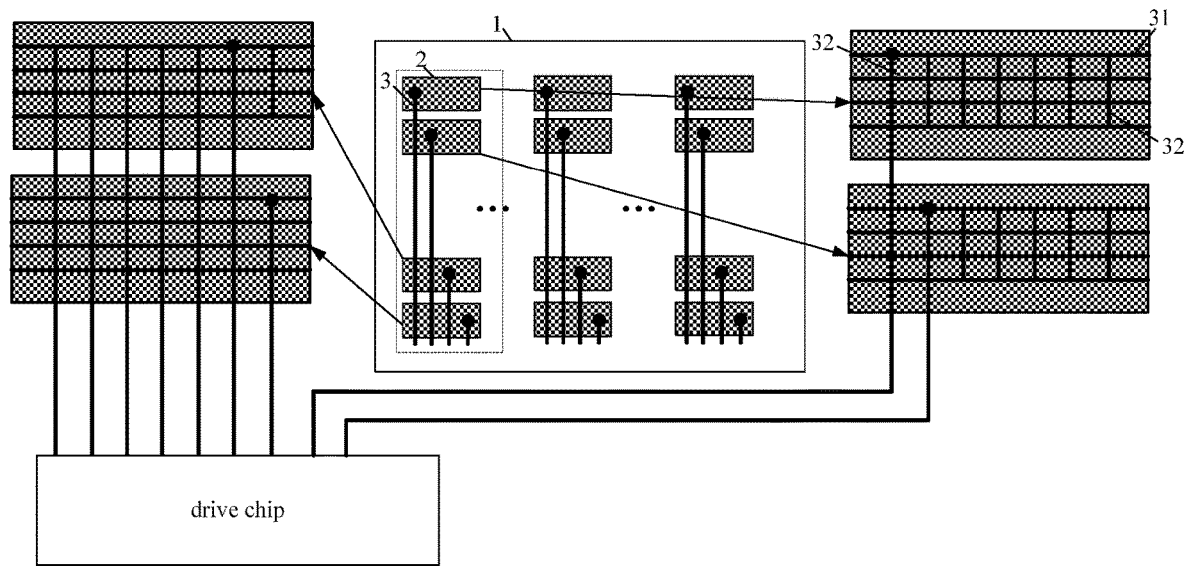
FIG. 3 is a schematic view of the array substrate according to an embodiment of the present disclosure.

Referring to FIG. 3, in an embodiment, the common electrode wire 3 corresponding to each sub-electrode 2 comprises a first sub-electrode wire 31 and a second sub-electrode wire 32. The first sub-electrode wire 31 has the same extension direction as the gate line of the array substrate, and they are formed in the same layer with the same material; the second sub-electrode wire 32 has the same extension direction as the data line of the array substrate and they are formed in the same layer with the same material.

Based on the above structure design, the first sub-electrode wire 31 and the gate line of the array substrate can be formed by the same patterning process; likewise, the second sub-electrode wire 32 and the data line of the array substrate can be formed by the same patterning process. Hence, the array substrate of the present embodiment does not require additional patterning processes to increase the manufacturing cost. In addition, in practical application, both the gate line and the data line of the array substrate can be made of metal materials, so the first sub-electrode wire and the second sub-electrode wire in the present embodiment can also be made of metal materials.

It can be understood from the example shown in FIG. 3 that, the orthographic projection of the first sub-electrode wire 31 on the base substrate 1 falls within the orthographic projection of the sub-electrode corresponding to the first sub-electrode wire 31 on the base substrate 1. Among the multiple second sub-electrode wires 32 corresponding to each of the sub-electrodes 2, one second sub-electrode wire extends to be connected to a drive chip so as to receive the touch scan signal and common voltage signal from the drive chip in a time-sharing manner, while orthographic projections of the rest second sub-electrode wires on the base substrate 1 fall within orthographic projection of the corresponding sub-electrode on the base substrate 1.

Take the sub-electrode 2 at the upper left corner of the base substrate 1 as shown in FIG. 3 as an example, in the common electrode wire corresponding to this sub-electrode, the leftmost second sub-electrode wire 32 is for connection to the drive chip. In the case where all second sub-electrode wires are arranged in the same layer, since the leftmost second sub-electrode wire 32 will extend in a column direction to the drive chip, it will hinder the arrangement of second sub-electrode wires corresponding to all other sub-electrodes below the sub-electrode 2 in the same position in the column direction. Therefore, with respect to the example of FIG. 3, for two adjacent sub-electrodes in the column direction, the number of the second sub-electrode wires corresponding to a sub-electrode close to the drive chip is smaller than the number of the second sub-electrode wires corresponding to a sub-electrode far from the drive chip.

Based on the above principle, in an embodiment, supposing that each column of sub-electrodes in the common electrode includes X sub-electrodes, and at most X second sub-electrode wires can be arranged in a sub-pixel region corresponding to each column of sub-electrodes, then only one second sub-electrode wire is provided for the bottom sub-electrode (i.e. the sub-electrode closest to the drive chip) among the column of sub-electrodes, and it is connected to the drive chip.

For the embodiment shown in FIG. 3, the sub-electrode furthest from the drive chip is provided with the largest number of second sub-electrode wires, so this sub-electrode has the smallest resistance, thereby compensating, to some extent, for the high resistance caused by the long length of the common electrode wires corresponding to this sub-electrode. The sub-electrode closest to the drive chip is provided with the smallest number of second sub-electrode wires, hence, the sub-electrode has a higher resistance, which, however, can be balanced out to some extent by the fact of a shorter length of the common electrode wire.

Therefore, with the example shown in FIG. 3, the resistance of each sub-electrode and the length of its corresponding common electrode wire can compensate for each other to some extent, so a better uniformity effect can be achieved.

FIG. 3 only gives an example introduction to the array substrate of the present embodiment, and based on the above principle, the above-mentioned technical effect in uniformity can be achieved in other different embodiments, as long as the sub-electrodes far from the drive chip are provided with more sub-electrode wires than the sub-electrodes close to the drive chip.

Further, in certain exemplary embodiments, in the common electrode wire corresponding to each sub-electrode, each first sub-electrode wire is connected to one or more second electrode wires so as to further reduce the overall resistance of the common electrode wire, thereby realizing a faster response when loading signals.

In an embodiment of the present disclosure, there is an insulating layer between the first sub-electrode wire that is at the same layer as the gate line and the second sub-electrode wire that is at the same layer as the data line, and a via hole can be arranged in the insulating layer, so that the first sub-electrode wire is connected to the second sub-electrode wire through the via hole.

In an example, one first sub-electrode wire can be connected to one second sub-electrode wire through one or more via holes in the insulating layer, namely, it is possible to provide multiple connection points between one first sub-electrode wire and one sub-second electrode wire, which may further effectively reduce the overall resistance of the common electrode wires.

A technical solution according to an example of the present disclosure has been described above, but it should be noted that those skilled in the art can make appropriate changes on the basis of the example. For example, one first sub-electrode wire in the common electrode wires corresponding to the sub-electrode can be connected to the drive chip; or it is also possible that all sub-electrode wires in the common electrode wires corresponding to the sub-electrodes extend in only one direction.

Figure 4:
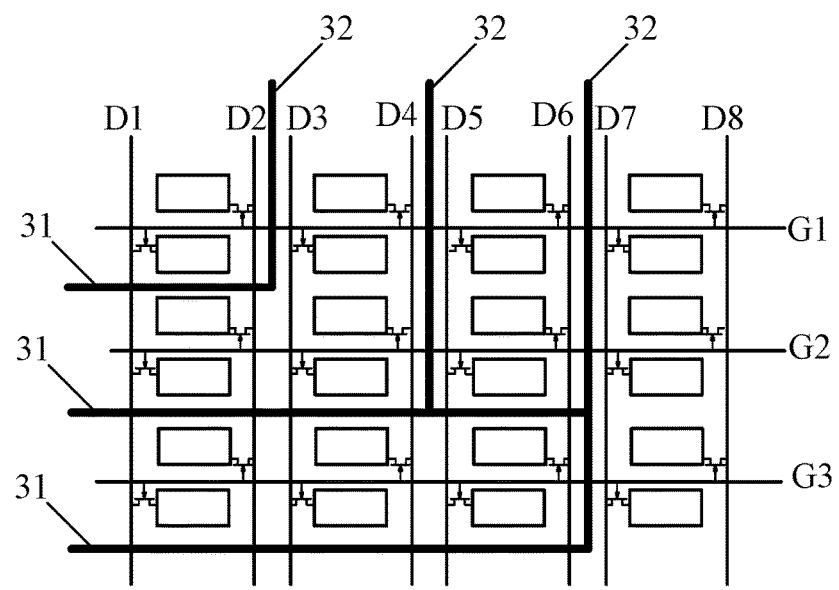
FIGS. 4 and 5 are schematic views of the array substrate according to another embodiment of the present disclosure.

As shown in FIG. 4, the array substrate according to another embodiment of the present disclosure comprises a plurality of sub-pixels arranged as an array (as shown by the rectangular lattice in FIG. 4), data lines D1-D8, and gate lines G1-G3. Two data lines are provided between two adjacent columns of sub-pixels, and data lines are provided at the left and right sides of each column of sub-pixels. As for the data lines at the left and right sides of each column of sub-pixels, one of them is used for driving sub-pixels of the odd rows, and the other is used for driving sub-pixels of even rows. A gate line is provided every two rows of sub-pixels, each gate line being used for driving two rows of sub-pixels adjacent thereto.

Further, as shown in FIG. 4, a first sub-electrode wire 31 is arranged between two adjacent rows of sub-pixels having no gate line provided therebetween, which extends in the same direction as the gate line, and a second sub-electrode wire 32 having the same extension direction as the data line is arranged between two data lines that are between two adjacent columns of sub-pixels. In the embodiment, each of the first sub-electrode wires 31 is connected to at least one second sub-electrode wire 32.

Figure 5:
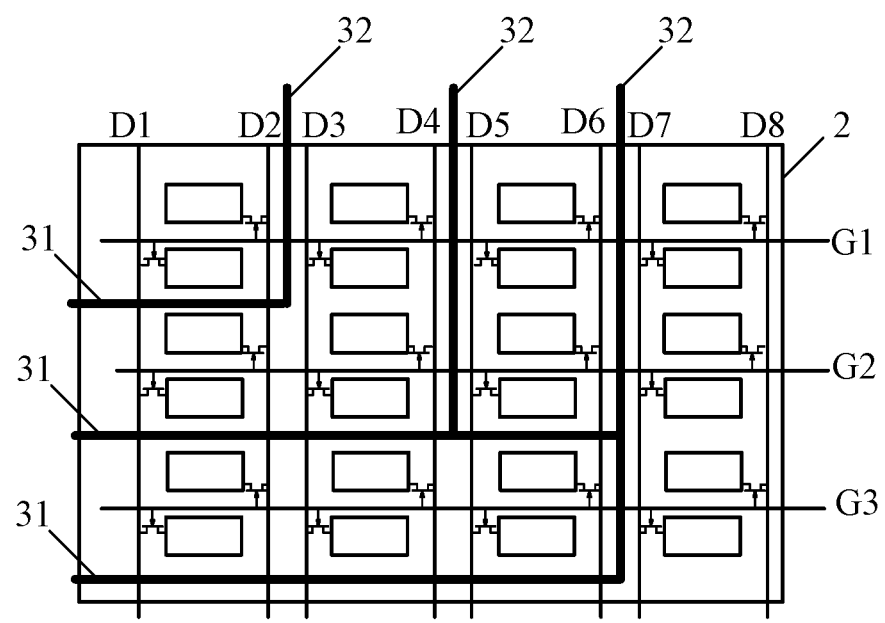

The pixel region as shown in FIG. 4 can be considered as a sub-electrode region, i.e. as shown in FIG. 5, the region for the sub-electrode region 2 contains three first sub-electrode wires 31 and three second sub-electrode wires 32, which are all connected to the sub-electrode 2, and one of the first sub-electrode wires or one of the second sub-electrode wires can be connected to the drive chip to obtain the common voltage signals and touch scan signals provided by the drive chip in a time-sharing manner.

The array substrate provided in the embodiment of the present disclosure has been described above, but it should be noted that the embodiment of the invention does not limit that the common electrode wire can only include the first sub-electrode wires and the second sub-electrode wires as well as the extension directions of the first sub-electrode wires and the second sub-electrode wires. It should be appreciated that, compared to the existing array substrate, sub-electrodes of the common electrode in the array substrate provided in these embodiments have a smaller overall resistance.

In addition, another embodiment of the present disclosure provides a display panel, which comprises the array substrate described in any one of the above embodiments. Based on the structure design for the array substrate provided in the embodiments of the present disclosure, the display panel provided in the embodiment can achieve more uniform brightness in displaying images, meanwhile, greenish phenomenon can be alleviated or avoided, thus better visual experiences can be provided to users.

Additionally, still another embodiment of the present disclosure provides a display device comprising the above-mentioned display panel, and the display device also has the advantageous effect similar to the display panel.

The above are detailed descriptions of some embodiments of the disclosure, but those skilled in the art can make improvements and modifications without departing from the principle of the invention, so such improvements and modifications are deemed to fall within the protection scope of the invention.

The invention claimed is:

1. An array substrate, comprising:
a base substrate,
a common electrode on the base substrate, the common electrode including a plurality of sub-electrodes arranged in an array, each sub-electrode being used for receiving a common voltage signal and a touch scan signal in a time-sharing manner, and
a common electrode wire corresponding to each sub-electrode,
wherein each sub-electrode receives the common voltage signal through the common electrode wire, and the common electrode wire comprises multiple sub-electrode wires, each of the multiple sub-electrode wires being connected to the sub-electrode corresponding to the common electrode wire,
wherein the common electrode wire corresponding to each sub-electrode comprises multiple first sub-electrode wires extending in a first direction and multiple second sub-electrode wires extending in a second direction,
wherein for a sub-electrode array arranged along the second direction in the common electrode, the number of the second sub-electrode wires corresponding to the sub-electrodes close to the drive chip is smaller than the number of the second sub-electrode wires corresponding to the sub-electrodes far from the drive chip.

2. The array substrate according to claim 1, wherein in the common electrode wire corresponding to each sub-electrode, each of the first sub-electrodes wires is connected to one or more second sub-electrode wires.

3. The array substrate according to claim 1, wherein the array substrate further comprises a gate line and a data line on the base substrate, wherein the first sub-electrode wires and the gate line extend in a same direction and are formed in a same layer with a same material, the second sub-electrode wires and the data line extend in a same direction and formed in a same layer with a same material.

4. The array substrate according to claim 1, wherein an orthographic projection of the first sub-electrode wire on the base substrate falls within an orthographic projection of the corresponding sub-electrode on the base substrate,
wherein among the multiple second sub-electrode wires corresponding to each of the sub-electrodes, one second sub-electrode wire extends to be connected to a drive chip, while orthographic projections of the rest second sub-electrode wires on the base substrate fall within an orthographic projection of the corresponding sub-electrode on the base substrate, and
wherein the drive chip is used for loading the common voltage signal and the touch scan signal to corresponding sub-electrodes in a time-sharing manner through the second sub-electrode wire connected thereto.

5. The array substrate according to claim 1, wherein one of the first sub-electrode wire and the second sub-electrode wire has a same extension direction as the gate line in the array substrate, and the other has a same extension direction as the data line in the array substrate.

6. The array substrate according to claim 1, wherein the array substrate further comprises a plurality of sub-pixels arranged as an array,
wherein two data lines are provided between two adjacent columns of sub-pixels so that each column of sub-pixels is interposed between left data lines and right data lines,
wherein for the data lines at the left and right sides of each column of sub-pixels, one of them is used for driving sub-pixels of odd rows and the other is used for driving sub-pixels of even rows,
wherein one gate line is provided every two rows of sub-pixels, each gate line being used for driving two rows of sub-pixels adjacent thereto.

7. The array substrate according to claim 6, wherein the first sub-electrodes wire is arranged between two adjacent rows of sub-pixels having no gate line provided therebetween,
wherein the second sub-electrode wire is arranged between the two data lines that are between two adjacent columns of sub-pixels.

8. A display panel, comprising the array substrate according to claim 1.

9. A display device, comprising the display panel according to claim 8 and a drive chip for providing the common voltage signal and the touch scan signal to the sub-electrodes in a time-sharing manner.

10. The display panel according to claim 8, wherein the common electrode wire corresponding to each sub-electrode comprises multiple first sub-electrodes wires extending in a first direction and/or multiple second sub-electrode wires extending in a second direction.

11. The display panel according to claim 10, wherein in the common electrode wire corresponding to each sub-electrode, each of the first sub-electrode wires is connected to one or more second sub-electrode wires.

12. The display panel according to claim 10, wherein the array substrate further comprises a gate line and a data line on the base substrate, wherein the first sub-electrode wires and the gate line extend in a same direction and are formed in a same layer with a same material, the second sub-electrode wires and the data line extend in a same direction and formed in a same layer with a same material.

13. The display panel according to claim 10, wherein an orthographic projection of the first sub-electrode wire on the base substrate falls within an orthographic projection of the corresponding sub-electrode on the base substrate,
wherein among the multiple second sub-electrode wires corresponding to each of the sub-electrodes, one second sub-electrode wire extends to be connected to a drive chip, while orthographic projections of the rest second sub-electrode wires on the base substrate fall within an orthographic projection of the corresponding sub-electrode on the base substrate, and
wherein the drive chip is used for loading the common voltage signal and the touch scan signal to corresponding sub-electrodes in a time-sharing manner through the second sub-electrode wire connected thereto.

14. The display panel according to claim 13 wherein for the sub-electrode array arranged along the second direction in the common electrode, the number of the second sub-electrode wires corresponding to the sub-electrodes close to the drive chip is smaller than the number of the second sub-electrode wires corresponding to the sub-electrodes far from the drive chip.

15. The display panel according to claim 14, wherein one of the first sub-electrode wire and the second sub-electrode wire has a same extension direction as the gate line in the array substrate, and the other has a same extension direction as the data line in the array substrate.

16. The display panel according to claim 10, wherein the array substrate further comprises a plurality of sub-pixels arranged as an array,
wherein two data lines are provided between two adjacent columns of sub-pixels so that each column of sub-pixels is interposed between left data lines and right data lines,
wherein for the data lines at the left and right sides of each column of sub-pixels, one of them is used for driving sub-pixels of odd rows and the other is used for driving sub-pixels of even rows,
wherein one gate line is provided every two rows of sub-pixels, each gate line being used for driving two rows of sub-pixels adjacent thereto.

17. The display panel according to claim 16, wherein the first sub-electrode wire is arranged between two adjacent rows of sub-pixels having no gate line provided therebetween,
wherein the second sub-electrode wire is arranged between the two data lines that are between two adjacent columns of sub-pixels.

* * * * *